United States Patent
Jeong et al.

(10) Patent No.: US 9,556,951 B2
(45) Date of Patent: Jan. 31, 2017

(54) GEAR-SHIFT LEVER MODULE

(71) Applicants: Hyundai Motor Company, Seoul (KR); Kia Motors Corp., Seoul (KR); Kyung Chang Industrial Co., Ltd., Daegu (KR)

(72) Inventors: Won Jin Jeong, Hwaseong-si (KR); Yang Rae Cho, Suwon-si (KR); Deok Ki Kim, Hwaseong-si (KR); Ji Soo Kim, Daegu (KR)

(73) Assignees: Hyundai Motor Company, Seoul (KR); Kia Motors Corp., Seoul (KR); Kyung Chang Industrial Co., Ltd., Daegu (KR)

( * ) Notice: Subject to any disclaimer, the term of this patent is extended or adjusted under 35 U.S.C. 154(b) by 28 days.

(21) Appl. No.: 14/533,872

(22) Filed: Nov. 5, 2014

(65) Prior Publication Data

US 2015/0323062 A1 Nov. 12, 2015

(30) Foreign Application Priority Data

May 8, 2014 (KR) ........................ 10-2014-0054914

(51) Int. Cl.
*F16H 59/10* (2006.01)
*F16H 59/02* (2006.01)
(Continued)

(52) U.S. Cl.
CPC ............. *F16H 59/105* (2013.01); *B60K 20/02* (2013.01); *F16H 59/0204* (2013.01);
(Continued)

(58) Field of Classification Search
CPC .................... F16H 2061/223; F16H 2061/226; F16H 2059/026; F16H 2059/0278; F16H 2059/0282; F16H 59/0204; F16H 59/02; F16H 59/10; F16H 59/105; F16H 61/22; F16H 2059/0239; F16H 59/12; F16H 59/0217; F16H 63/34; F16H 63/3441; B60K 20/02
(Continued)

(56) References Cited

U.S. PATENT DOCUMENTS 6,401,564 B1 * 6/2002 Lee .................... B60K 20/04
  200/61.88
6,550,351 B1 * 4/2003 O'Reilly ............... F16H 59/105
  74/335
(Continued)

FOREIGN PATENT DOCUMENTS

JP 09-112670 A 5/1997
KR 10-2000-0013358 A 3/2000
(Continued)

*Primary Examiner* — William Kelleher
*Assistant Examiner* — Joseph Brown
(74) *Attorney, Agent, or Firm* — Morgan, Lewis & Bockius LLP

(57) ABSTRACT

A gear-shift lever module with various sensors integrated on one circuit board may include a module housing, the integrated circuit board disposed in the module housing, a position sensor, a manual mode switch and a connector. The position sensor senses a shift position of a gear-shift lever and is disposed on the integrated circuit board at a position corresponding to a hinge portion at a lower end of the gear-shift lever. The manual mode switch is disposed on the integrated circuit board at a position corresponding to a manual mode of the gear-shift lever and senses the manual mode by being pressed by the gear-shift lever when the gear-shift lever is positioned for the manual mode. The connector is electrically connected with the position sensor and the manual mode switch.

5 Claims, 4 Drawing Sheets

(51) Int. Cl.
*F16H 61/22* (2006.01)
*F16H 59/04* (2006.01)
*B60K 20/02* (2006.01)
*F16H 63/48* (2006.01)

(52) U.S. Cl.
CPC ....... *F16H 59/0278* (2013.01); *F16H 59/044* (2013.01); *F16H 59/10* (2013.01); *F16H 61/22* (2013.01); *F16H 63/483* (2013.01); *F16H 2059/026* (2013.01); *F16H 2059/0239* (2013.01); *F16H 2059/0282* (2013.01); *F16H 2061/223* (2013.01); *F16H 2061/226* (2013.01); *Y10T 74/2003* (2015.01)

(58) Field of Classification Search
USPC .......................................... 74/473.12, 473.21
See application file for complete search history.

(56) References Cited

U.S. PATENT DOCUMENTS

| | | | | |
|---|---|---|---|---|
| 6,592,492 B1* | 7/2003 | Kalia | ................ | B60R 25/02144 477/96 |
| 6,761,084 B2* | 7/2004 | Suzuki | ................. | F16H 59/105 74/473.18 |
| 6,865,967 B2* | 3/2005 | Shioji | ..................... | F16H 59/10 74/473.18 |
| 7,086,306 B2* | 8/2006 | Syamoto | ............. | F16H 59/0204 74/471 XY |
| 7,750,624 B2* | 7/2010 | Heo | .................... | F16H 59/0204 324/207.23 |
| 8,560,194 B2* | 10/2013 | Kim | ...................... | B60K 20/02 180/332 |
| 8,616,081 B2* | 12/2013 | Kino | ..................... | B60K 20/08 74/473.3 |
| 9,027,428 B2* | 5/2015 | Iwata | ....................... | G01B 7/14 324/207.11 |
| 2004/0226801 A1* | 11/2004 | De Jonge | ........... | F16H 59/0204 192/220.7 |
| 2013/0025397 A1* | 1/2013 | Choi | ................... | F16H 59/0204 74/473.12 |
| 2014/0318296 A1* | 10/2014 | Zweigle | ............. | F16H 61/0006 74/473.12 |

FOREIGN PATENT DOCUMENTS

| | | | |
|---|---|---|---|
| KR | 10-0302294 B1 | 11/2001 | |
| KR | 10-0365192 B1 | 12/2002 | |
| KR | 10-0505720 B1 | 8/2005 | |
| KR | 10-2012-0102612 A | 9/2012 | |
| KR | 10-1336612 B1 | 11/2013 | |
| KR | 10-1381346 B1 | 4/2014 | |
| WO | WO 0108919 A1 * | 2/2001 | ......... F16H 59/0204 |

* cited by examiner

GEAR-SHIFT LEVER MODULE

CROSS-REFERENCE TO RELATED APPLICATION

The present application claims priority of Korean Patent Application Number 10-2014-0054914 filed on May 8, 2014, the entire contents of which application are incorporated herein for all purposes by this reference.

BACKGROUND OF INVENTION

Field of Invention

The present invention relates to a gear-shift lever module that can considerably reduce a disconnection, a short circuit, and/or other damages by modularizing electric devices, using one integrated circuit board.

Description of Related Art

Gear-shift lever modules of the related art have four stages consisting of park, reverse, neutral, and drive and are changed into a manual mode in the drive state in accordance with the intention of a driver before automatic shifting, so they can shift gears up and down one by one. However, these gear-shift lever modules have a problem in that the structures are very complicated because a sensor that senses them, a switch, and a fixing portion are separated and connected by wires.

Accordingly, there is a problem in that when a problem such as a disconnection or a short circuit is generated, a gear-shift lever fails to fully perform its function in driving and it may cause an unexpected serious problem such as sudden acceleration.

Further, components are separately assembled and cables are connected in the process of producing the selection lever of automatic transmissions of the related art, and accordingly, defects are frequently generated or the amount of work increases due to difficulty in assembly, so the manufacturing cost increases.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides a gear-shift lever module that can considerably reduce a disconnection, a short circuit, and/or other damages by modularizing electric devices, using one integrated circuit board.

In various aspects, the present invention provides a gear-shift lever module with various sensors integrated on one circuit board, which includes: a module housing; an integrated circuit board disposed in the module housing; a position sensor that senses a shift position of a gear-shift lever, the position sensor disposed on the integrated circuit board at a position corresponding to a hinge portion at a lower end of the gear-shift lever; a manual mode switch that is disposed on the integrated circuit board at a position corresponding to a manual mode of the gear-shift lever and senses the manual mode by being pressed by the gear-shift lever when the gear-shift lever is positioned for the manual mode; and a connector that is electrically connected with the position sensor and the manual mode switch.

The position sensor may include a magnetic part rotating about a rotary shaft and a hole sensor sensing rotation of the magnetic part, and the magnetic part may be connected with the lower end of the gear-shift lever and rotates with the gear-shift lever pivoting.

The magnetic part may be disposed on the module housing with a center on or aligned with the rotary shaft and may have a locking pin at one end, the locking pin may be connected with the lower end of the gear-shift lever, and an arc guide hole that guides the locking pin may be formed at the module housing.

The manual mode switch may include a selection knob that is elastically supported upward and senses selection of the manual mode when it slides down and a shift knob that is disposed at an upper end of the selection knob, has an insertion groove at a center portion, is elastically supported forward/backward, and senses shift-up/down when it slides forward/backward. A protrusion that is inserted into the insertion groove and pressurizes the selection knob when the gear-shift lever pivots to a side may be formed at the gear-shift lever.

The gear-shift lever module may further include a parking mode switch that is disposed on the integrated circuit board, elastically supported downward, pressed and slid upward by a detent pin on the gear-shift lever and senses a parking mode the gear-shift lever.

An engaging lever that pivots with the gear-shift lever may be disposed at the lower end of the gear-shift lever, a locking hole may be formed at the engaging lever, and a solenoid driving unit may be disposed on the integrated circuit board and a locking pin may be disposed at a center portion of the solenoid driving unit and move in or out such that the locking pin may be moved outward and inserted into the locking hole by operation of the solenoid driving unit when the gear-shift lever is in the parking mode and an engine is stopped.

A flange may be formed at an end of the locking pin, an emergency-off button exposed to an outside may be disposed and elastically supported upward at an upper end of the module housing, and an inclined surface may be formed at the lower end of the emergency-off button, wherein when the emergency-off button slides down, the inclined surface presses the flange of the locking pin and the locking pin slides backward accordingly.

According to the gear-shift lever module of the present invention, since all of electric devices for the gear-shift lever module are disposed on one integrated circuit board, there is less risk of disconnection and short circuit, as compared with the related art. Further, the probability of breakdown is reduced by one modularizing process and it is simple to assemble the gear-shift lever module in the manufacturing process and to install the module, so it is possible to reduce the manufacturing cost of the product. Further, since the shift locking/releasing function can be implemented directly by operating a solenoid, assembly is easy, probability of breakdown is low, and the mechanical configuration is simple.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
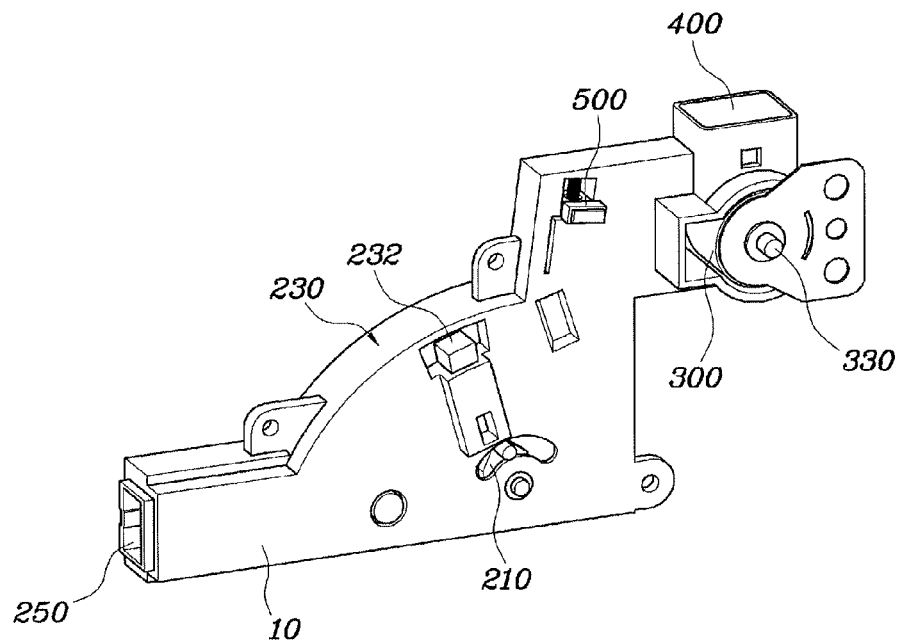
FIG. 1 is a perspective view of an exemplary gear-shift lever module according to the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
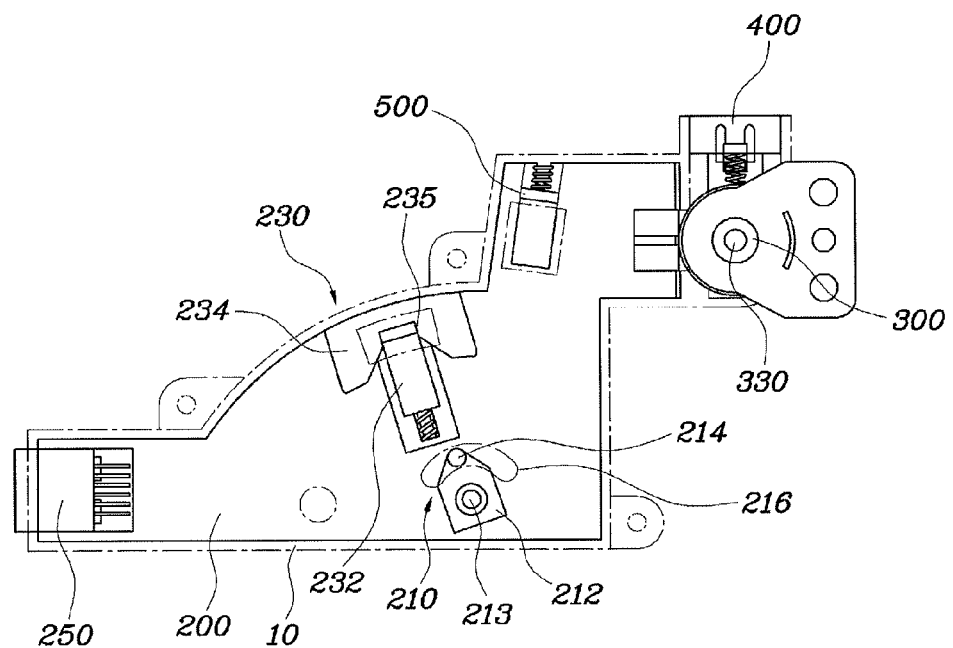
FIG. 2 is a side view of an exemplary gear-shift lever module according to the present invention.
Figure 3:
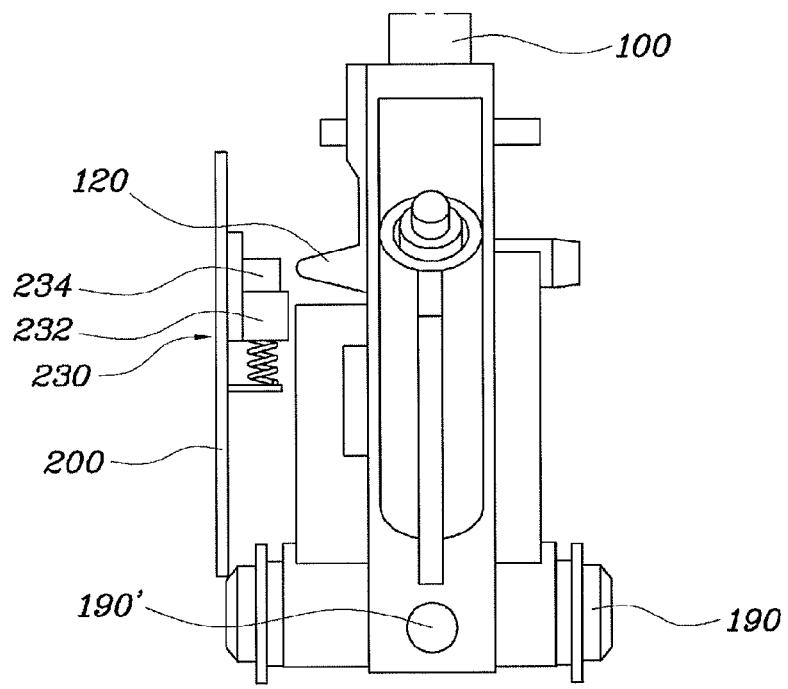
FIG. 3 and FIG. 4 are side views showing a selected manual mode of a gear-shift lever according to the present invention.
Figure 4:
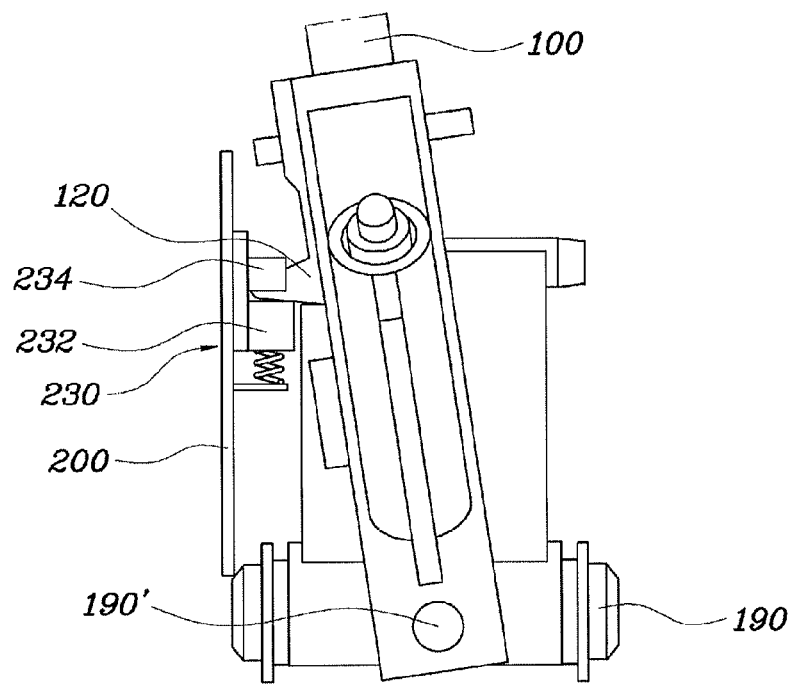
Figure 5:
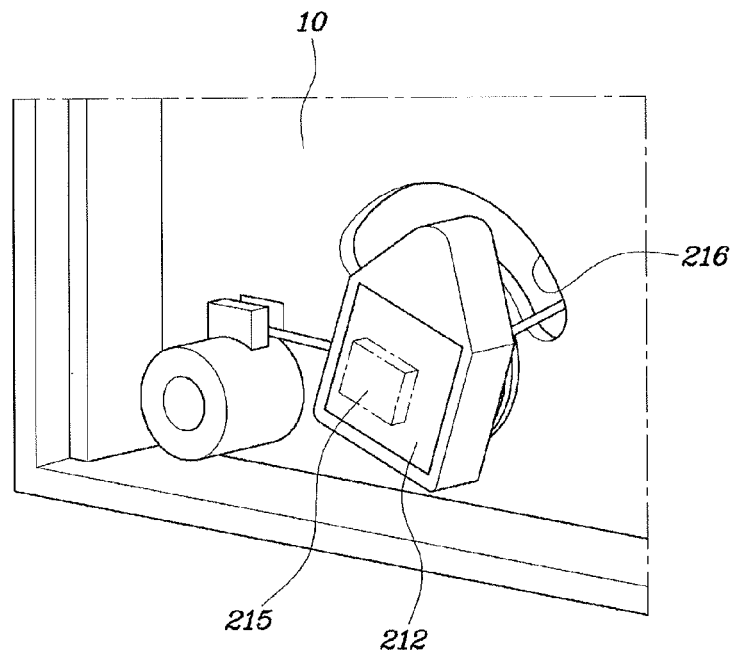
FIG. 5 is a view showing a position sensor of an exemplary gear-shift lever module according to the present invention.
Figure 6:
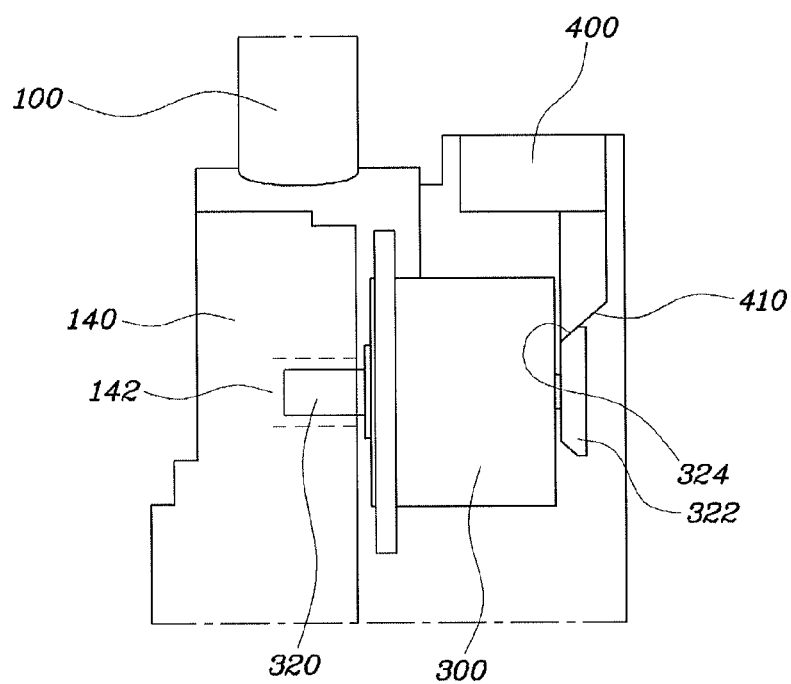
FIG. 6 and FIG. 7 are views showing a switch for manually releasing a gear-shift lever according to the present invention.
Figure 7:
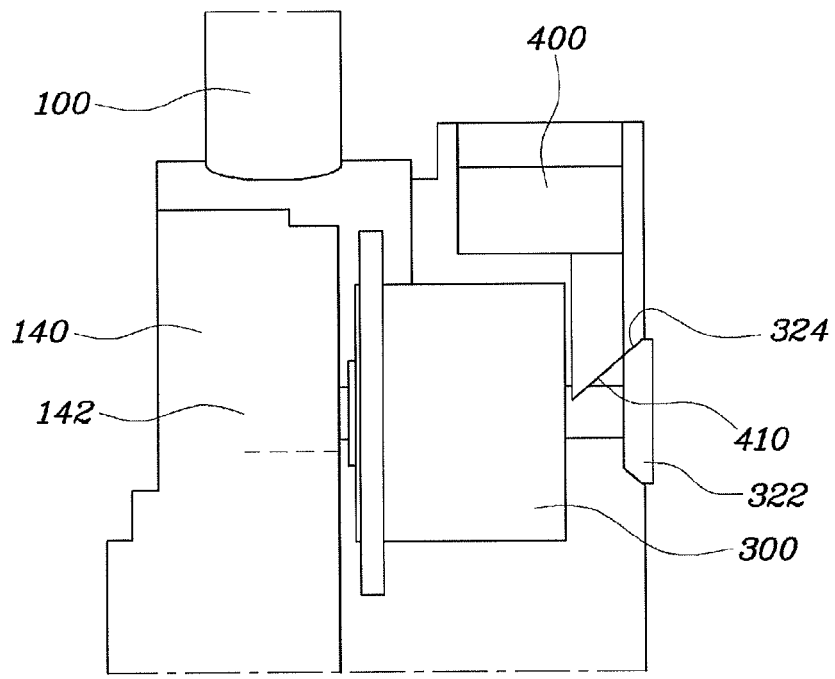
Figure 8:
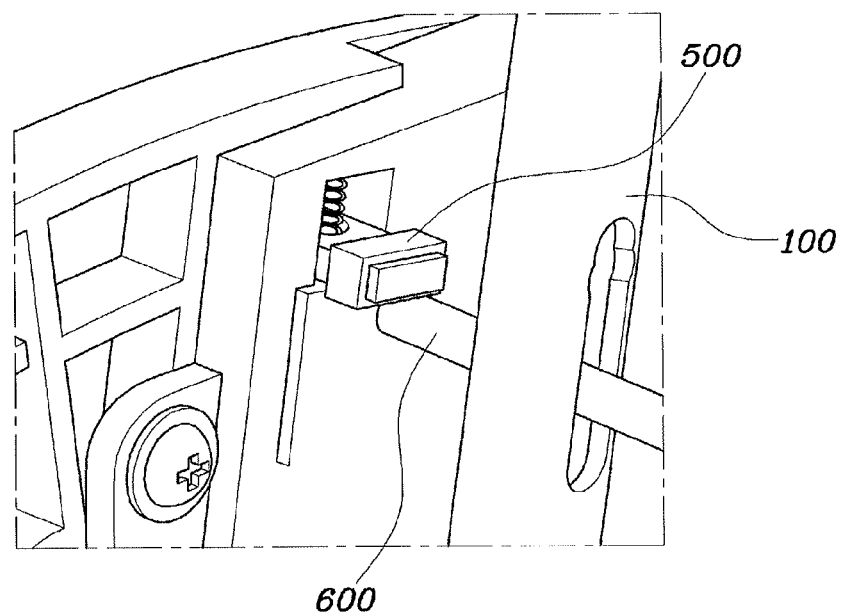
FIG. 8 is a view showing a parking mode switch of an exemplary gear-shift lever module according to the present invention.

FIG. 1 is a perspective view of a gear-shift lever module, FIG. 2 is a side view of the gear-shift lever module, FIGS. 3 and 4 are side views showing a selected manual mode of a gear-shift lever, FIG. 5 is a view showing a position sensor of the gear-shift lever, FIGS. 6 to 7 are views showing a switch for manually releasing the gear-shift lever, and FIG. 8 is a view showing a parking mode switch of the gear-shift lever, according to various embodiments of the present invention.

A gear-shift lever module according to the present invention, which is a gear-shift lever module with various sensors integrated on one circuit board, as shown in FIGS. 1 and 2, includes a module housing 10, an integrated circuit board 200 in the module housing 10, a position sensor 210 that senses the shift position of a gear-shift lever 100, at a position corresponding to a hinge portion 190 at the lower end of the gear-shift lever 100, on the integrated circuit board 200, a manual mode switch 230 that is disposed at a position corresponding to a manual mode of the gear-shift lever 100 on the integrated circuit board 200 and senses the manual mode by being pressed by the gear-shift lever 100 when the gear-shift lever 100 is positioned for the manual mode, and a connector 250 that is electrically connected with the position sensor 210 and the manual mode switch 230.

According to the present invention, it is possible to achieve a simpler structure by implementing all of electric devices on the integrated circuit board 200 in the module housing 10, as in FIG. 2. In detail, the gear-shift lever module according to the present invention has the integrated circuit board 200 in the module housing 10 as a main part.

On the integrated circuit board 200, the gear-shift lever 100 is positioned at a drive mode, the manual mode switch 230 is disposed at the corresponding position when the gear-shift lever 100 is moved to a side, and the position sensor 210 that senses movement of the gear-shift lever 100 is disposed at the position corresponding to the hinge portion 190 of the gear-shift lever 100.

A parking position switch 500 is disposed on the integrated circuit board 200, at the position corresponding to a detent pin 600 on the gear-shift lever 100 when the gear-shift lever 100 is at a parking position.

As in FIG. 5, there is a need of a sensing unit that senses the position of the gear-shift lever 100 due to a pivot of a magnetic part 212 on the gear-shift lever 100 and in some embodiments, it is preferable to use a hole sensor 215 in this configuration. In this case, all the electric devices for the gear-shift lever 100 module are disposed on one integrated circuit board 200, so the risk of disconnection and short circuit is reduced as compared to the way of the related art.

That is, the position sensor 210 is composed of the magnetic part 212 disposed on the module housing 10 and rotating about a rotary shaft 213 and the hole sensor 215 disposed on the integrated circuit board 200 and sensing rotation of the magnetic part 212, and the magnetic part 212 is connected with the lower end of the gear-shift lever 100 and can rotate with the gear-shift lever 100 pivoting.

To this end, the magnetic part 212 may be disposed on the module housing 10 with the center on or aligned with the rotary shaft 213 and have a locking pin 214 at the end, the locking pin 214 may be connected with the lower end of the gear-shift lever 100, and an arc guide hole 216 that guides the locking pin 214 may be formed at the module housing 10.

In detail, the gear-shift lever 100, as shown in FIGS. 3 and 4, has a protrusion 120 at a height corresponding to the manual mode switch 230 and the manual mode switch 230 senses a manual mode by being pressed by the protrusion 120 in the manual mode of the gear-shift lever 100.

The manual mode switch 230 is composed of a selection knob 232 that is elastically supported upward and senses selection of the manual mode when it slides down and a shift knob 234 that is disposed at the upper end of the selection knob 232, has an insertion groove 235 at the center or center portion, is elastically supported forward/backward, and senses shift-up/down when it slides forward/backward, and a protrusion 120 that is inserted into the insertion groove 235 and pressurizes the selection knob 232 when the gear-shift lever 100 pivots to a side may be formed at the gear-shift lever 100.

When the gear-shift lever 100 is moved to the left to change into the manual mode from the drive mode, the gear-shift lever 100 slides to a side around a second rotary shaft 190' and the protrusion 120 at a height corresponding to the manual mode switch 230 presses the manual mode switch 230, thereby preparing the manual mode. In this state, when the gear-shift lever 100 is pushed forward or pulled backward, gears are shifted up or down and the manual state is implemented.

Further, as shown in FIG. 8, the present invention may further include a parking mode switch 500 that is disposed on the integrated circuit board 200, elastically supported downward, and is pressed and slid upward by a detent pin 600 on the gear-shift lever 100 and senses a parking mode in the parking mode of the gear-shift lever 100.

When the gear-shift lever 100 is positioned in the parking mode, the detent pin 600 at any one portion of the gear-shift lever 100 pushes up the parking mode switch 500, the parking mode is sensed.

That is, there was a problem in that since a micro switch is connected to a connector by a cable, so it would be easily broken, but in the present invention, the parking mode switch 500 is arranged on the integrated circuit board 200, so repair is easy and there is less probability of malfunction in comparison to the related art.

Further, as shown in FIGS. 6 and 7, an engaging lever 140 that pivots with the gear-shift lever 100 is disposed at the lower end of the gear-shift lever 100, a locking hole 142 is formed at the engaging lever 140, and a solenoid driving unit 300 and a locking pin 320 that is disposed at the center or center portion of the solenoid driving unit 300 and moves out or in are disposed on the integrated circuit board 200, and thus, the locking pin 320 can be moved outward and inserted into the locking hole 142 by the operation of the solenoid driving unit 300 when the gear-shift lever 100 is in the parking mode and the engine is stopped.

That is, when the gear-shift lever 100 is in the parking mode and the engine is stopped, the solenoid driving unit 300 operates and the gear-shift lever 100 is fixed.

Further, in the present invention, the solenoid driving unit 300 is selectively inserted into the locking hole 142 of the engaging lever 140 and the gear-shift lever 100 is fixed, so the structure is simpler than the mechanical technology of the related art, and accordingly, repair is easy and minor breakdowns are not generated.

Further, as shown in FIGS. 6 and 7, in the present invention, a flange 322 is formed at the end of the locking pin 320, an emergency-off button 400 exposed to the outside is disposed and elastically supported upward at the upper end of the module housing 10, and an inclined surface 410 is formed at the lower end of the emergency-off button 400, so when the emergency-off button 400 slides down, the inclined surface 410 presses the flange 322 of the locking pin 320 and accordingly the locking pin can slide backward.

Therefore, the solenoid driving unit 300 fixes the gear-shift lever 100 in response to an electric signal, but when the solenoid driving unit 300 breaks down, the battery is fully discharged, or when it is required to shift the gears to the neutral state after parking, the lever cannot be released in the parking mode, so the emergency-off button 400 for manually releasing the fixed lever is provided.

Further, since the emergency-off button 400 has the inclined surface 410 at the lower portion and a second inclined surface 324 is formed at the flange 322, the second inclined surface 324 is pressed by the inclined surface 410 formed at the lower portion of the emergency-off button 400 and the locking pin 320 is moved backward, so the fixed lever is released.

That is, in the present invention, since the sliding portion is smoothly moved backward by the inclined surface of the emergency-off button 400, the structure is simple and the risk of breakdown is reduced.

According to the gear-shift lever module having the structure described above or the like, since all of electric devices for the gear-shift lever module are disposed on one integrated circuit board, there is less risk of disconnection and short circuit, as compared with the related art. Further, the probability of breakdown is reduced by one modularizing process and it is simple to assemble the gear-shift lever module in the manufacturing process and to install the module, so it is possible to reduce the manufacturing cost of the product. Further, since the shift locking/releasing function can be implemented directly by operating a solenoid, assembly is easy, probability of breakdown is low, and the mechanical configuration is simple.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear-shift lever module with a plurality of sensors integrated on an integrated circuit board, the gear-shift lever module comprising:
   a module housing;
   the integrated circuit board disposed in the module housing;
   a position sensor sensing a shift position of a gear-shift lever, wherein the position sensor is disposed on the integrated circuit board at a position corresponding to a hinge portion at a lower end of the gear-shift lever;
   a manual mode switch disposed on the integrated circuit board at a position corresponding to a manual mode of the gear-shift lever sensing the manual mode by being pressed by the gear-shift lever when the gear-shift lever is positioned for the manual mode; and
   a connector electrically connected with the position sensor and the manual mode switch,
   wherein:
   an engaging lever pivoting with the gear-shift lever is disposed at the lower end of the gear-shift lever;
   a locking hole is formed at the engaging lever;
   a solenoid driving unit is disposed on the integrated circuit board; and
   a locking pin is disposed at a center portion of the solenoid driving unit and moves in or out, such that the locking pin is moved outward and inserted into the locking hole by operation of the solenoid driving unit when the gear-shift lever is in a parking mode and an engine is stopped, and wherein:
- a flange is formed at an end of the locking pin;
- an emergency-off button exposed to an outside is disposed and elastically supported upward at an upper end of the module housing; and
- an inclined surface is formed at a lower end of the emergency-off button and aligned to face the flange of the locking pin, wherein when the emergency-off button slides down, the inclined surface directly presses the flange of the locking pin wherein the inclined surface is inclined with an obtuse angle with respect to a longitudinal axis of the emergency-off button, the flange is inclined with an acute angle with respect to the longitudinal axis of the emergency-off button, and the locking pin slides in a longitudinal direction of the locking pin relative to the emergency-off button and moves backward accordingly.

2. The gear-shift lever module of claim 1, wherein the position sensor includes:
- a magnetic part rotating about a rotary shaft; and
- a hole sensor sensing rotation of the magnetic part, wherein the magnetic part is connected with the lower end of the gear-shift lever and rotates with the gear-shift lever pivoting.

3. The gear-shift lever module of claim 2, wherein:
the magnetic part is disposed on the module housing with a center on or aligned with the rotary shaft and has a locking pin at one end,
the locking pin is connected with the lower end of the gear-shift lever, and
an arc guide hole that guides the locking pin is formed at the module housing.

4. The gear-shift lever module of claim 1, wherein:
the manual mode switch includes:
- a selection knob elastically supported upward and sensing selection of the manual mode when it slides down, and
- a shift knob disposed at an upper end of the selection knob, wherein the shift knob has an insertion groove at a center portion, is elastically supported forward/backward, and senses shift-up/down when it slides forward/backward; and
a protrusion that is inserted into the insertion groove and pressurizes the selection knob when the gear-shift lever pivots to a side, is formed at the gear-shift lever.

5. The gear-shift lever module of claim 1, further comprising:
a parking mode switch disposed on the integrated circuit board, elastically supported downward, pressed and slid upward by a detent pin on the gear-shift lever, and sensing a parking mode of the gear-shift lever.

* * * * *